(12) United States Patent
Chen et al.

(10) Patent No.: US 6,563,134 B1
(45) Date of Patent: May 13, 2003

(54) OPTOELECTRONIC MICROELECTRONIC FABRICATION WITH ATTENUATED LIGHT LEAKAGE

(75) Inventors: Hei-Lun Chen, Jubei (TW); Kt Ou, Hsin Chu (TW); Claire Chen, Hsinchu (TW); Shr-Jung Chung, Taichung (TW); Che Heng Wang, Taipei (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 10/171,746

(22) Filed: Jun. 14, 2002

(51) Int. Cl.[7] .................. H01L 29/04; H01L 31/06; H01L 31/0376; H01L 31/20
(52) U.S. Cl. .................. 257/59; 257/72; 257/74; 349/110; 349/111
(58) Field of Search .................. 257/59, 72; 438/27; 349/44, 110, 111, 38

(56) References Cited

U.S. PATENT DOCUMENTS

| | | | |
|---|---|---|---|
| 4,999,619 A | * | 3/1991 | Te Velde .................. 349/167 |
| 5,461,501 A | * | 10/1995 | Sato et al. .................. 349/42 |
| 5,822,028 A | * | 10/1998 | Miyawaki .................. 349/111 |
| 5,963,289 A | | 10/1999 | Stefanov et al. |
| 6,175,442 B1 | | 1/2001 | Booth, Jr. et al. |
| 6,208,392 B1 | | 3/2001 | Miller et al. |
| 6,445,005 B1 | * | 9/2002 | Yamazaki et al. .................. 257/72 |
| 6,452,652 B1 | * | 9/2002 | Moore .................. 349/110 |
| 2002/0167743 A1 | * | 11/2002 | Matsuo et al. .................. 359/891 |

* cited by examiner

*Primary Examiner*—Carl Whitehead, Jr.
*Assistant Examiner*—William C Vesperman
(74) *Attorney, Agent, or Firm*—Tung & Associates

(57) ABSTRACT

Within a method for fabricating an optoelectronic microelectronic fabrication, and the optoelectronic microelectronic fabrication fabricated in accord with the method, there is formed at least in part within an annular gap interposed between: (1) a patterned optical barrier layer which defines an aperture; and (2) a electrical contact formed within the aperture and laterally separated from the patterned optical barrier layer by the annular gap, an annular optical baffle layer. Within the present invention, when there is further formed over the patterned optical barrier layer and electrically connected with the electrical contact a pixel electrode plate layer, the annular optical baffle layer provides for attenuated light leakage to a switching element formed beneath the patterned optical barrier layer.

7 Claims, 2 Drawing Sheets

US 6,563,134 B1

OPTOELECTRONIC MICROELECTRONIC FABRICATION WITH ATTENUATED LIGHT LEAKAGE

BACKGROUND OF THE INVENTION

1. Field of the Invention

The present invention relates generally to optoelectronic microelectronic fabrications. More particularly, the present invention relates to optoelectronic microelectronic fabrications with attenuated light leakage.

2. Description of the Related Art

Microelectronic fabrications are formed microelectronic substrates over which are formed patterned microelectronic conductor layers which are separated by microelectronic dielectric layers.

Within the general art of microelectronic fabrication, there exist purely electronic microelectronic fabrications whose operation is based solely upon electrical signal storage and processing characteristics of purely electronic microelectronic devices and microelectronic circuits formed upon a microelectronic substrate. Examples of such purely electronic microelectronic fabrications typically include, but are not limited to, semiconductor integrated circuit microelectronic fabrications and ceramic substrate microelectronic fabrications. Similarly, there also exist within the general art of microelectronic fabrication microelectronic fabrications whose operation is based upon a codependent transduction, storage and/or processing of optical and electrical signals while employing optoelectronic microelectronic devices formed upon a microelectronic substrate. Examples of such optoelectronic microelectronic fabrications typically include, but are not limited to: (1) solar cell optoelectronic microelectronic fabrications; and (2) image array optoelectronic microelectronic fabrications such as but not limited to: (a) sensor image array optoelectronic microelectronic fabrications; and (b) display image array optoelectronic microelectronic fabrications. Sensor image array optoelectronic microelectronic fabrications typically find use within electronic devices such as digital cameras, while display image array optoelectronic microelectronic fabrications analogously find use within electronic devices such as digital projectors and personal computer user interface displays.

While optoelectronic microelectronic fabrications are thus clearly desirable in the art of microelectronic fabrication insofar as they often provide a means for realizing unique consumer product applications within the art of microelectronic fabrication, optoelectronic microelectronic fabrications in general, and more particularly display image array optoelectronic microelectronic fabrications, are nonetheless not entirely without problems in the art of microelectronic fabrication. In that regard, it is often difficult in the art of display image array optoelectronic microelectronic fabrication to fabricate display image array optoelectronic microelectronic fabrications with attenuated light (i.e., optical radiation) leakage.

It is thus desirable in the art of display image array optoelectronic microelectronic fabrication to fabricate display image array optoelectronic microelectronic fabrications with attenuated light leakage.

It is towards the foregoing object that the present invention is directed.

Various optoelectronic microelectronic fabrications having desirable properties, and methods for fabrication thereof, have been disclosed in the art of optoelectronic microelectronic fabrication.

Included among the optoelectronic microelectronic fabrications and methods for fabrication thereof, but not limited among the optoelectronic microelectronic fabrications and methods for fabrication thereof, are optoelectronic microelectronic fabrications and methods for fabrication thereof disclosed within: (1) Te Velde, in U.S. Pat. No. 4,999,619 (a reflective liquid crystal display (LCD) image array optoelectronic microelectronic fabrication fabricated such that an effective optical path length difference between two optical states of a liquid crystal material layer formed therein differs by one-half a central wavelength of optical radiation incident upon the reflective liquid crystal display (LCD) image array optoelectronic microelectronic fabrication); (2) Stevanov et al., in U.S. Pat. No. 5,963,289 (a method for fabricating a liquid crystal on silicon (LCOS) optoelectronic microelectronic fabrication such as to provide a silicon semiconductor substrate base substrate which is asymmetrically offset with respect to a glass substrate capping substrate; (3) Booth, Jr. et al., in U.S. Pat. No. 6,175,442 (an anti-reflection layer for use in attenuating light leakage within a spatial light modulator, such as a liquid crystal on silicon (LCOS) optoelectronic microelectronic fabrication, where the anti-reflection layer has a surface formed as an array of micro-conical protrusions); and (4) Miller et al., in U.S. Pat. No. 6,208,392 (a display image array optoelectronic microelectronic fabrication, such as a liquid crystal on silicon (LCOS) display image array optoelectronic microelectronic fabrication, wherein a silicon substrate base substrate is spaced from a glass substrate capping substrate by a series of spacer layers photolithographically formed as metallization layers formed upon the silicon substrate base substrate).

Desirable in the art of display image array optoelectronic microelectronic fabrication are additional methods and materials which may be employed for forming display image array optoelectronic microelectronic fabrications with attenuated light leakage.

It is towards the foregoing object that the present invention is directed.

SUMMARY OF THE INVENTION

A first object of the invention is to provide a display image array optoelectronic microelectronic fabrication, and a method for fabricating the display image array optoelectronic microelectronic fabrication.

A second object of the present invention is to provide the display image array optoelectronic microelectronic fabrication and the method for fabricating the display image array optoelectronic microelectronic fabrication in accord with the first object of the present invention, wherein the display image array optoelectronic microelectronic fabrication is fabricated with attenuated light leakage.

A third object of the present invention is to provide the display image array optoelectronic microelectronic fabrication and the method for fabricating the display image array optoelectronic microelectronic fabrication in accord with the first object of the present invention and the second object of the present invention, wherein the method is readily commercially implemented.

In accord with the objects of the present invention, there is provided by the present invention: (1) a method for fabricating a base substrate for a display image array optoelectronic microelectronic fabrication; and (2) the base substrate for the display image array optoelectronic microelectronic fabrication, as fabricated employing the method.

To practice the method of the present invention, there is first provided a base substrate having formed therein a switching element. There is then formed over the base substrate and the switching element a patterned optical barrier layer which defines an aperture having formed therein an electrical contact for the switching element. Within the present invention, the electrical contact is laterally separated within the aperture from the patterned optical barrier layer by an annular gap. There is then formed at least in part within the annular gap an annular optical baffle layer. Finally, there is formed at least in part over the patterned optical barrier layer and electrically connected with the electrical contact a pixel electrode plate layer.

There is provided by the present invention a display image array optoelectronic microelectronic fabrication and a method for fabricating the display image array optoelectronic microelectronic fabrication, wherein the display image array optoelectronic microelectronic fabrication is fabricated with an attenuated light leakage.

The present invention realizes the foregoing object by forming at least in part within an annular gap interposed between: (1) a patterned optical barrier layer which defines an aperture; and (2) a electrical contact formed within the aperture and laterally separated from the patterned optical barrier layer by the annular gap, an annular optical baffle layer. Within the present invention, when there is further formed over the patterned optical barrier layer and electrically connected with the electrical contact a pixel electrode plate layer, the annular optical baffle layer provides for attenuated light leakage to a switching element formed beneath the patterned optical barrier layer.

The method of the present invention is readily commercially implemented.

The present invention employs methods and materials as are generally known in the art of optoelectronic microelectronic fabrication, but employed within the context of a specific process ordering to provide a specific optoelectronic microelectronic fabrication structure in accord with the present invention. Since it is thus a specific process ordering and a specific resulting optoelectronic microelectronic fabrication structure which provides at least in part the present invention, rather than the existence of methods and materials which provides the present invention, the method of the present invention is readily commercially implemented.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

There is provided by the present invention a display image array optoelectronic microelectronic fabrication and a method for fabricating the display image array optoelectronic microelectronic fabrication, wherein the display image array optoelectronic microelectronic fabrication is fabricated with an attenuated light leakage.

The present invention realizes the foregoing object by forming at least in part within an annular gap interposed between: (1) a patterned optical barrier layer which defines an aperture; and (2) a electrical contact formed within the aperture and laterally separated from the patterned optical barrier layer by the annular gap, an annular optical baffle layer. Within the present invention, when there is further formed over the patterned optical barrier layer and electrically connected with the electrical contact a pixel electrode plate layer, the annular optical baffle layer provides for attenuated light leakage to a switching element formed beneath the patterned optical barrier layer.

Although the preferred embodiment of the present invention illustrates the present invention within the context of fabricating a liquid crystal on silicon (LCOS) reflective display image array optoelectronic microelectronic fabrication, the present invention is not so limited.

Rather, the present invention may be employed for forming, with attenuated light leakage, any of several optoelectronic microelectronic fabrications. Such optoelectronic microelectronic fabrications will generally be reflective display image array optoelectronic microelectronic fabrications. Similarly, such reflective display image array optoelectronic microelectronic fabrications may be selected from the group including but not limited to liquid crystal on silicon (LCOS) display image array optoelectronic microelectronic fabrications (which employ as a switching element a field effect transistor (FET) device formed within a bulk silicon substrate) and thin film transistor (TFT) liquid crystal display image array optoelectronic microelectronic fabrications (which employ as a switching element a field effect transistor (FET) device formed as a thin film field effect transistor (FET) device.

Referring now to FIG. 1 to FIG. 6, there is shown a series of schematic cross-sectional diagrams illustrating the results of progressive stages of forming, in accord with a preferred embodiment of the present invention, a liquid crystal on silicon (LCOS) display image array optoelectronic microelectronic fabrication.

Figure 1:
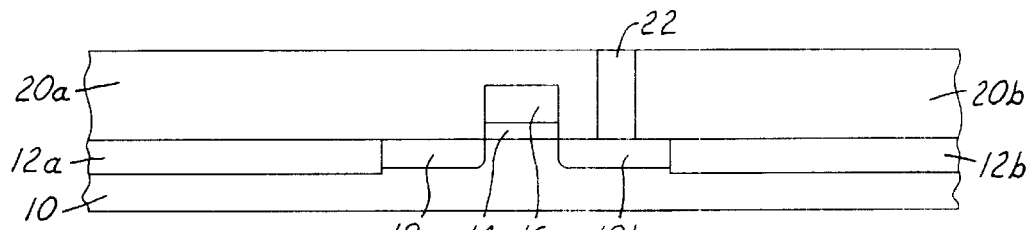
FIG. 1, FIG. 2, FIG. 3, FIG. 4, FIG. 5 and FIG. 6 show a series of schematic cross-sectional diagrams illustrating the results of progressive stages of forming, in accord with a preferred embodiment of the present invention, a liquid crystal on silicon (LCOS) display image array optoelectronic microelectronic fabrication.

Shown in FIG. 1 is a schematic cross-sectional diagram of the liquid crystal on silicon (LCOS) display image array optoelectronic microelectronic fabrication at an early stage in its fabrication in accord with the preferred embodiment of the present invention.

Shown in FIG. 1, in a first instance, is a semiconductor substrate 10 having formed therein a pair of isolation regions 12a and 12b which defines an active region of the semiconductor substrate 10.

Within the preferred embodiment of the present invention with respect to the semiconductor substrate 10, and although the present invention may be practiced with respect to semiconductor substrates of various elemental compositions, various dopant concentrations and various crystallographic orientations, for the preferred embodiment of the present invention, the semiconductor substrate 10 is typically and preferably a (100) silicon semiconductor substrate having at least either N- or P-doped regions.

Similarly, although it is also known in the art of silicon semiconductor substrate fabrication that isolation regions may be formed employing methods including but not limited to isolation region thermal growth methods and isolation region deposition/patterning methods, for the preferred embodiment of the present invention the isolation regions 12a and 12b are, as is illustrated within the schematic cross-sectional diagram of FIG. 1, typically and preferably formed as a pair of shallow trench isolation (STI) regions.

Shown also within the schematic cross-sectional diagram 1, and formed within and upon the active region of the semiconductor substrate 10 as defined by the pair of isolation regions 12a and 12b, is a series of structures from which is formed a field effect transistor (FET) device. As is understood by a person skilled in the art, the series of structures comprises: (1) a gate dielectric layer 14 formed upon the active region of the semiconductor substrate 10; (2) a gate electrode 16 formed and aligned upon the gate dielectric layer 14; and (3) a pair of source/drain regions 18a and 18b formed into the active region of the semiconductor substrate at locations not covered by the gate dielectric layer 14 and the gate electrode 16.

Each of the foregoing series of structures from which is formed the field effect transistor (FET) device may be formed employing methods, materials and structural dimensions as are otherwise generally conventional in the art of optoelectronic microelectronic fabrication. Typically and preferably, the gate dielectric layer 14 is formed of a silicon oxide dielectric material formed upon the active region of the semiconductor substrate 10. Typically and preferably, the gate electrode 16 is formed of a polysilicon material or polycide material formed and aligned upon the gate dielectric layer 14. Typically and preferably, the pair of source/drain regions is formed by ion implantation of an appropriate dopant ion into the active region of the semiconductor substrate 10, while employing the gate electrode as a mask, while employing an ion implantation dose.

Finally, there is also shown within the schematic cross-sectional diagram of FIG. 1, and covering the semiconductor substrate 10, including the series of structures from which is formed the field effect transistor (FET) device, a pair of patterned pre-metal dielectric (PMD) layers 20a and 20b which defines a first aperture which exposes a portion of the source/drain region 18b. Similarly, there is also shown within the schematic cross-sectional diagram of FIG. 1, and formed into the first aperture, a conductor contact stud 22 contacting the source/drain region 18b.

Within the preferred embodiment of the present invention, the pair of patterned pre-metal dielectric (PMD) layers 20a and 20b may be formed employing methods and materials as are conventional in the art of optoelectronic microelectronic fabrication. Typically and preferably, each of the pair of patterned pre-metal dielectric (PMD) layers 20a and 20b is formed at least in part of a silicon oxide dielectric material.

Within the preferred embodiment of the present invention with respect to the conductor contact stud 22, the conductor contact stud 22 is typically and preferably formed at least in part of a tungsten conductor material formed at least in part employing a chemical mechanical polish (CMP) planarizing method, although other methods and materials may also be employed for forming the conductor contact stud 22.

While the preferred embodiment of the liquid crystal on silicon (LCOS) display image array optoelectronic microelectronic fabrication whose schematic cross-sectional diagram is illustrated in FIG. 1. FIG. 1 illustrates the pair of patterned pre-metal dielectric layers 20a and 20b as single layers and the conductor contact stud 22 as a single layer directly connected to a portion of the source/drain region 18b exposed within the first aperture defined by the pair of patterned pre-metal dielectric layers 20a and 20b, the present invention is neither intended to be so limited, nor is often in fact actually so limited. Rather, (1) the pair of patterned pre-metal dielectric layers 20a and 20b is alternatively intended as representative of a laminated series of patterned dielectric sub-layers comprising both patterned pre-metal dielectric (PMD) sub-layers and patterned inter-metal dielectric (IMD) sub-layers; and (2) the conductor contact stud 22 is alternatively intended as representative of a laminated series of conductor sub-layers comprising conductor stud sub-layers and conductor interconnect sub-layers. The present invention does not discriminate with respect to further processing of such alternative representations and constructions of the pair of patterned premetal dielectric (PMD) layers 20a and 20b and the conductor contact stud 22 within the liquid crystal on silicon (LCOS) display image array optoelectronic microelectronic fabrication whose schematic cross-sectional diagram is illustrated in FIG. 1.

Typically and preferably, the present invention is practiced under circumstances where: (1) the pair of patterned premetal dielectric layers 20a and 20b comprises at least a laminated stack of a pair of patterned pre-metal dielectric (PMD) sub-layers having formed thereupon a pair of patterned inter-metal dielectric (IMD) sub-layers; and (2) the conductor contact stud 22 comprises at least a conductor contact stud sub-layer having laminated thereto a patterned first conductor interconnect stud sub-layer. Finally, and in accord with further disclosure below, the present invention is more typically directed (but not limited) to attenuation of light leakage through apertures defined within upper lying patterned conductor layers within optoelectronic microelectronic fabrications, rather than apertures defined within lower lying patterned conductor layers within optoelectronic microelectronic fabrications.

Figure 2:
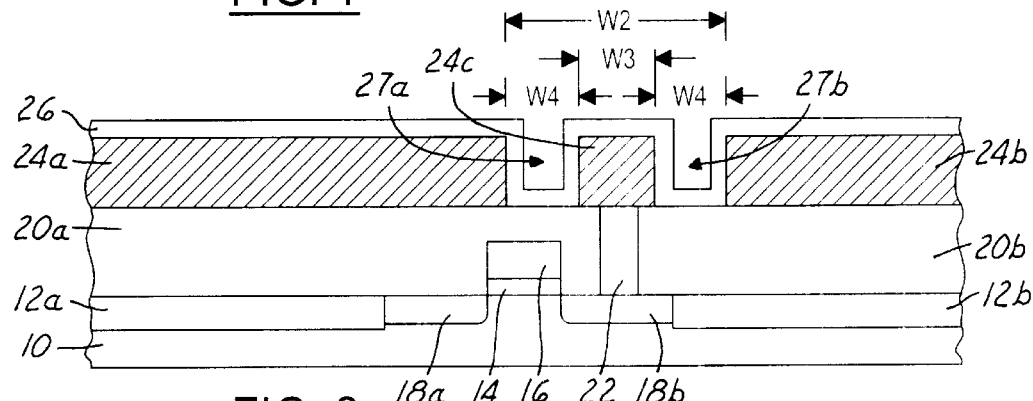

Referring now to FIG. 2, there is shown a schematic cross-sectional diagram illustrating the results of further processing of the liquid crystal on silicon (LCOS) display image array optoelectronic microelectronic fabrication whose schematic cross-sectional diagram is illustrated in FIG. 1.

Shown in FIG. 2 is a schematic cross-sectional diagram of a liquid crystal on silicon (LCOS) display image array optoelectronic microelectronic fabrication otherwise equivalent to the liquid crystal on silicon (LCOS) display image array optoelectronic microelectronic fabrication whose schematic cross-sectional diagram is illustrated in FIG. 1, but wherein: (1) there is formed upon the pair of patterned pre-metal dielectric (PMD) layers 20a and 20b a corresponding pair of patterned optical barrier conductor layers 24a and 24b; and (2) there is formed spanning the pair of patterned pre-metal dielectric (PMD) layers 20a and 20b and contacting the conductor contact stud 22 a patterned conductor interconnect layer 24c (which serves as an electrical contact to the source/drain region 18b within the bulk silicon semiconductor substrate 10 field effect transistor (FET) device which serves as the switching element within the liquid crystal on silicon (LCOS) display image array optoelectronic microelectronic fabrication whose schematic cross-sectional diagram is illustrated in FIG. 2.

Within the preferred embodiment of the present invention, the pair of patterned optical barrier conductor layers 24a and 24b, and the patterned conductor interconnect layer 24c are typically and preferably patterned from a single blanket conductor layer having formed upon its exposed upper surface a conductive anti-reflective coating (ARC) material. Within the preferred embodiment of the present invention, the single blanket conductor layer is typically and preferably formed of an aluminum containing conductor material formed to a thickness of from about 1000 to about 3000 angstroms, while the conductive anti-reflective coating (ARC) material is typically and preferably a titanium nitride material formed to a thickness of from about 500 to about 2000 angstroms. Other conductor materials, conductive anti-reflective materials and thicknesses may, however, be employed for forming the pair of patterned optical barrier conductor layers 24a and 24b, and the patterned conductor interconnect layer 24c.

As is also understood by a person skilled in the art, the pair of patterned optical barrier conductor layers 24a and 24b is intended, in a plan-view diagram, to represent a single patterned optical barrier conductor layer which defines a second aperture having preferably nominally centered therein (within the limits of photolithographic resolution) the patterned conductor interconnect layer 24c which in turn is separated from the single patterned optical barrier conductor layer by an annular gap.

As is illustrated within the schematic cross-sectional diagram of FIG. 2, the second aperture typically and preferably has an aperture width W2, the patterned conductor interconnect layer 24c typically and preferably has a linewidth W3 and the annular gap typically and preferably has a gap width W4 of from about 0.45 to about 0.8 microns.

Finally, there is also shown within the schematic cross-sectional diagram of FIG. 1, and formed upon exposed portions patterned optical barrier conductor layers 24a and 24b, the patterned conductor interconnect layer 24c and the patterned pre-metal dielectric (PMD) layers 20a and 20b a blanket conformal spacer dielectric layer 26 which does not completely fill the annular gap, to thus form therefrom a pair of partially filled annular gaps 27a and 27b which are representative of a single partially filled annular gap which completely surrounds the patterned conductor interconnect layer 24c.

Within the preferred embodiment of the present invention, the blanket conformal spacer dielectric layer 26 may be formed employing methods and materials as are conventional in the art of optoelectronic microelectronic fabrication. Typically and preferably, the blanket conformal spacer dielectric layer 26 is formed to a thickness of from about 2000 to about 3000 angstroms, without any planarization (such as but not limited to chemical mechanical polish (CMP) planarization) and at least in part from a silicon oxide dielectric material.

Figure 3:
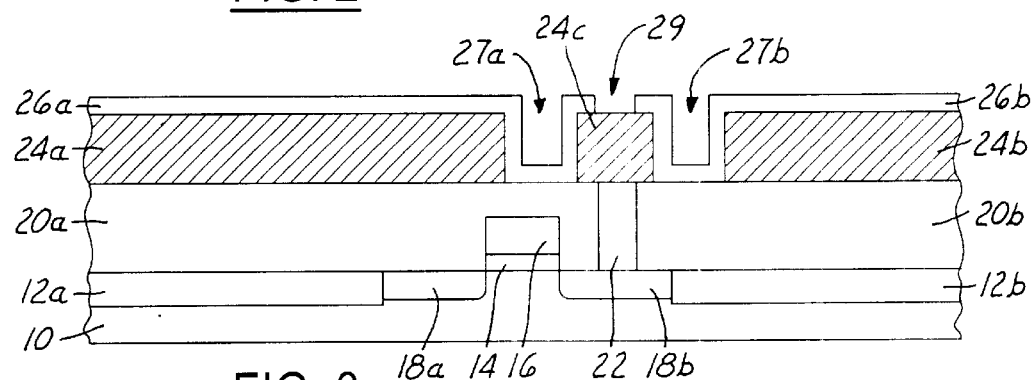

Referring now to FIG. 3, there is shown a schematic cross-sectional diagram illustrating the results of further processing of the liquid crystal on silicon (LCOS) display image array optoelectronic microelectronic fabrication whose schematic cross-sectional diagram is illustrated in FIG. 2.

Shown in FIG. 3 is a schematic cross-sectional diagram of a liquid crystal on silicon (LCOS) display image array optoelectronic microelectronic fabrication otherwise equivalent to the liquid crystal on silicon (LCOS) display image array optoelectronic microelectronic fabrication whose schematic cross-sectional diagram is illustrated in FIG. 2, but wherein the blanket conformal spacer dielectric layer 26 has been patterned to form a pair of patterned conformal spacer dielectric layers 26a and 26b which in turn define a third aperture 29 which leaves exposed a portion of the patterned conductor interconnect layer 24c.

Within the preferred embodiment of the present invention, the blanket conformal spacer dielectric layer 26 may be patterned to form the pair of patterned conformal spacer dielectric layers 26a and 26b while employing photolithographic and etch methods as are conventional in the art of optoelectronic microelectronic fabrication.

Figure 4:
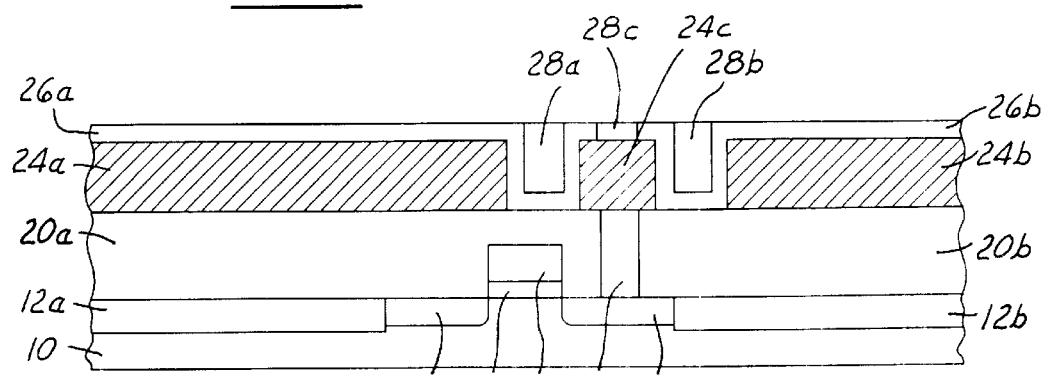

Referring now to FIG. 4, there is shown a schematic cross-sectional diagram illustrating the results of further processing of the liquid crystal on silicon (LCOS) display image array optoelectronic microelectronic fabrication whose schematic cross-sectional diagram is illustrated in FIG. 3.

Shown in FIG. 4 is a schematic cross-sectional diagram of a liquid crystal on silicon (LCOS) display image array optoelectronic microelectronic fabrication otherwise equivalent to the liquid crystal on silicon (LCOS) display image array optoelectronic microelectronic fabrication whose schematic cross-sectional diagram is illustrated in FIG. 3, but wherein: (1) there is formed into the pair of partially filled annular gaps 27a and 27b a pair of optical baffle layers 28a and 28b; and (2) there is formed into the third aperture 29 a conductor interconnect stud layer 28c contacting the patterned conductor interconnect layer 24c.

Within the preferred embodiment of the present invention, the pair of optical baffle layers 28a and 28b (which is representative of an annular optical baffle layer) and the conductor interconnect stud layer 28c are typically and preferably formed of a tungsten conductor material, formed in part employing a chemical mechanical polish (CMP) planarizing method, although other conductor materials and fabrication methods may also be employed for forming the pair of optical baffle layers 28a and 28b and the conductor interconnect stud layer 28c.

Figure 7:
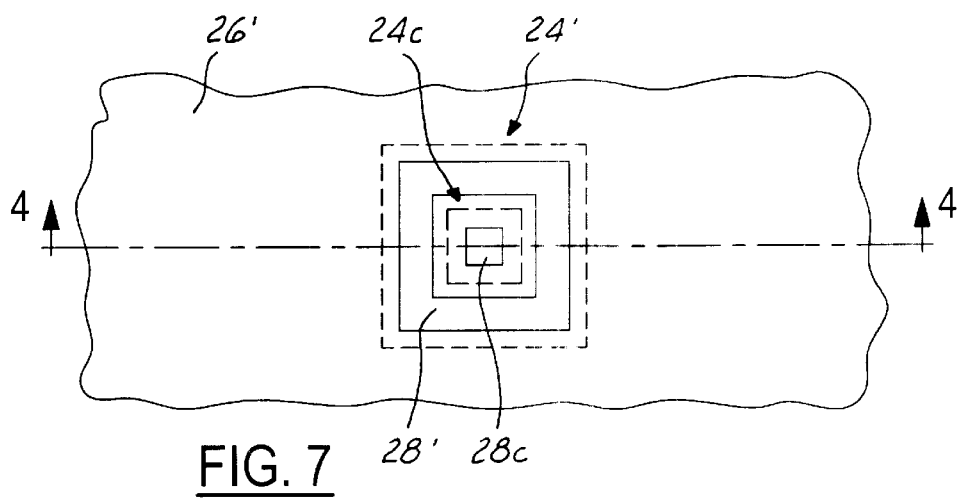
FIG. 7 shows a schematic plan-view diagram corresponding with the schematic cross-sectional diagram of FIG. 4.

Referring now to FIG. 7, there is shown a schematic plan-view diagram corresponding with the schematic cross-sectional diagram of FIG. 4.

As is shown within the schematic plan-view diagram of FIG. 7, there is illustrated a patterned conformal spacer dielectric layer 26' (corresponding with the pair of patterned conformal spacer dielectric layers 26a and 26b) which encloses in a first instance an annular optical baffle layer 28' (corresponding with the pair of patterned optical baffle layers 28a and 28b). As is also illustrated within the schematic cross-sectional diagram of FIG. 7, an interior portion of the patterned conformal spacer dielectric layer 26' separates the annular optical baffle layer 28' from the conductor interconnect stud 28c. Illustrated also within the schematic cross-sectional diagram of FIG. 7 by outlines are an underlying patterned optical barrier conductor layer 24' (corresponding with the pair of underlying patterned optical barrier conductor layers 24a and 24b), and the patterned conductor interconnect layer 24c. Remaining structures have been omitted for clarity.

Figure 5:
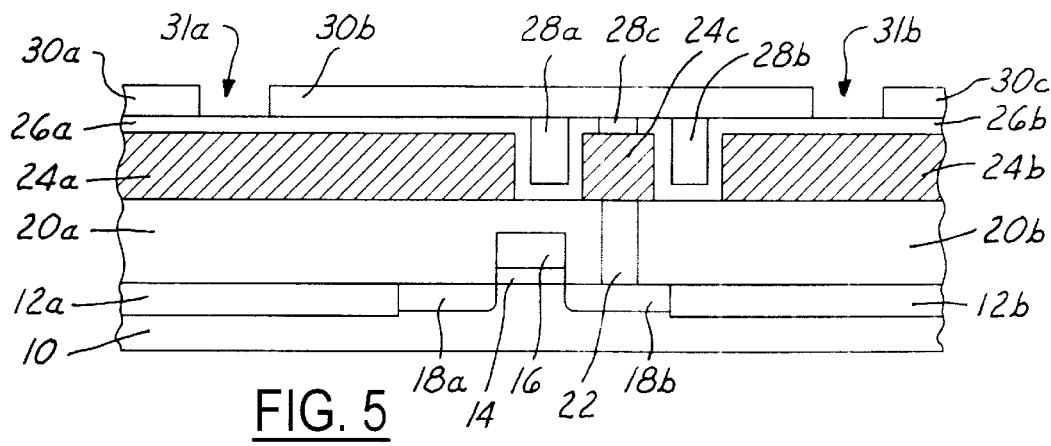

Referring now to FIG. 5, there is shown a schematic cross-sectional diagram illustrating the results of further processing of the liquid crystal on silicon (LCOS) display image array optoelectronic microelectronic fabrication whose schematic cross-sectional diagram is illustrated in FIG. 4.

Shown in FIG. 5 is a schematic cross-sectional diagram of a liquid crystal on silicon (LCOS) display image array optoelectronic microelectronic fabrication otherwise equivalent to the liquid crystal on silicon (LCOS) display image array optoelectronic microelectronic fabrication whose schematic cross-sectional diagram is illustrated in FIG. 4, but wherein there is formed at least in part upon at least one of the pair of patterned conformal spacer dielectric layers 26a and 26b a series of pixel electrode mirror plates 30a, 30b and 30c.

In particular within the context of the present invention with respect to the pixel electrode mirror plate 30b, the pixel electrode mirror plate 30b contacts both of the patterned optical baffle layers 28a and 28b (which is preferred but not required within the present invention), as well as being electrically connected with the conductor interconnect stud 28c (which is required within the present invention) which in turn provides electrical contact with the source/drain region 18b.

As is understood by a person skilled in the art, the series of pixel electrode mirror plate layers 30a, 30b and 30c is separated by a pair of gaps 31a and 31b, typically and preferably of gap width from about 0.4 to about 1.0 microns, in order to provide optimal optical resolution of the liquid crystal on silicon (LCOS) display image array optoelectronic microelectronic fabrication whose schematic cross-sectional diagram is illustrated in FIG. 5. Similarly, due to presence of the pair of gaps 31a and 31b, it is common in the art of reflective display image array optoelectronic microelectronic fabrication for incident light to leak along the pathway of the pair of patterned conformal isolation dielectric layers 26a and 26b and reach the active region of the semiconductor substrate 10 where such leaked light might contribute to a dark current within the field effect transistor (FET) device switching element whose schematic cross-sectional diagram is illustrated in FIG. 5. Within the context of the present invention, the extent and presence of such light leakage is attenuated due to the presence of the pair of patterned optical baffle layers 28a and 28b. Similarly, the extent and presence of such light leakage is attenuated due to a comparative thinness with which is formed the blanket conformal spacer dielectric layer, absent planarizing.

Figure 6:
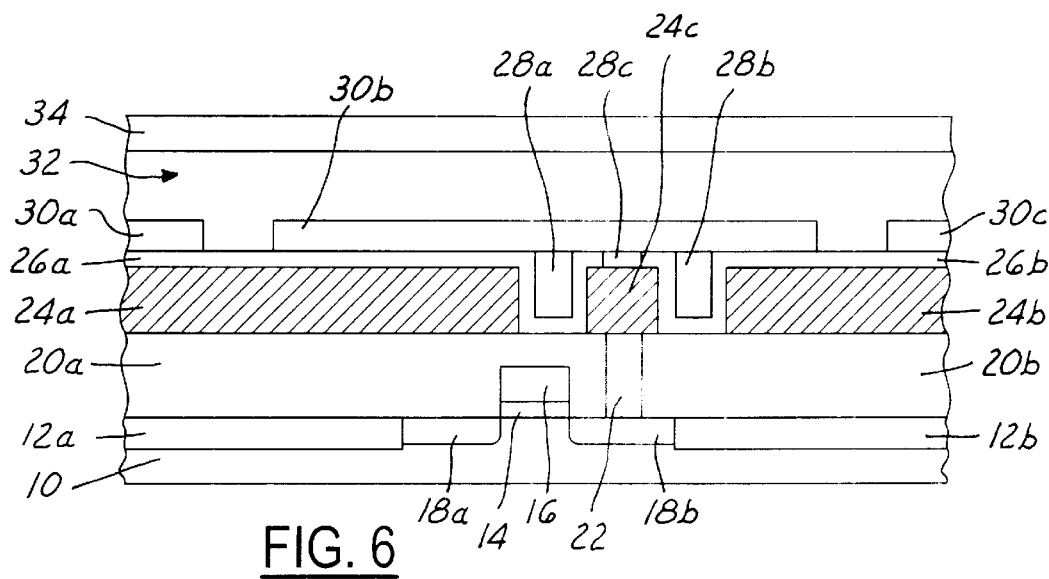

Referring now to FIG. 6, there is shown a schematic cross-sectional diagram illustrating the results of further processing of the liquid crystal on silicon (LCOS) display image array optoelectronic microelectronic fabrication whose schematic cross-sectional diagram is illustrated in FIG. 5.

Shown in FIG. 6 is a schematic cross-sectional diagram of a liquid crystal on silicon (LCOS) display image array optoelectronic microelectronic fabrication otherwise equivalent to the liquid crystal on silicon (LCOS) display image array optoelectronic microelectronic fabrication whose schematic cross-sectional diagram is illustrated in FIG. 5, but wherein there is formed over the series of pixel electrode mirror plates 30a, 30b and 30c a liquid crystal enclosure gap 32, which in turn is enclosed by a glass substrate capping substrate 34 (as well as a series of vertical standoffs which are not otherwise illustrated within the schematic cross-sectional diagram of FIG. 6).

Within the preferred embodiment of the present invention, the liquid crystal enclosure gap 32 is typically and preferably from about 1.0 to about 4.0 microns in thickness and will typically and preferably be, incident to further fabrication of the liquid crystal on silicon (LCOS) display image array optoelectronic microelectronic fabrication whose schematic cross-sectional diagram is illustrated in FIG. 6, filled with a liquid crystal material as is otherwise conventional in the art of optoelectronic microelectronic fabrication.

Similarly, the glass substrate capping substrate 34 as illustrated within the schematic cross-sectional diagram of FIG. 6 is also conventional in the art of display image array optoelectronic microelectronic fabrication. It will typically and preferably have formed on its interior surface a transparent electrode layer, such as may be formed from an indium-tin oxide material.

As is understood by a person skilled in the art, the preferred embodiment of the present invention is illustrative of the present invention rather than limiting of the present invention. Revisions and modifications may be made to methods, materials, structures and dimensions which are employed to form a display image array optoelectronic microelectronic fabrication in accord with the preferred embodiment of the present invention while still forming an optoelectronic microelectronic fabrication in accord with the present invention, further in accord with the appended claims.

What is claimed is:

1. A base substrate for a display image array optoelectronic microelectronic fabrication comprising:

a base substrate having formed therein a switching element;

a patterned optical barrier layer formed over the base substrate and the switching element, the patterned optical barrier layer defining an aperture, the aperture having formed therein an electrical contact for the switching element, the electrical contact being laterally separated within the aperture from the patterned optical barrier layer by an annular gap;

an annular optical baffle layer formed at least in part within the annular gap; and a pixel electrode plate layer formed at least in part over the patterned optical barrier layer and electrically connected with the electrical contact.

2. The base substrate of claim 1 wherein the switching element is selected from the group consisting of bulk silicon field effect transistor (FET) devices and thin film field effect transistor (FET) devices.

3. The base substrate of claim 1 wherein the patterned optical barrier layer and the electrical contact are formed of a conductor material.

4. The base substrate of claim 1 further comprising:

a blanket conformal spacer layer formed into the annular gap, wherein:

the blanket conformal spacer layer separates the annular optical baffle layer from both the patterned optical barrier layer and the electrical contact; and the blanket conformal spacer layer also separates the patterned optical barrier layer from the pixel electrode plate layer.

5. The base substrate of claim 4 wherein the blanket conformal spacer layer is formed of a dielectric material and is not planarized.

6. The base substrate of claim 1 further comprising a glass substrate capping substrate assembled spaced over the pixel electrode plate layer to define a liquid crystal gap interposed between the pixel electrode plate layer and the glass substrate capping substrate.

7. The base substrate of claim 6 further comprising a liquid crystal material filled into the liquid crystal gap.

* * * * *